April 12, 1938.   W. T. POWELL   2,114,255
CENTRALIZING TRAFFIC CONTROLLING SYSTEM FOR RAILROADS
Filed April 28, 1934   2 Sheets-Sheet 1
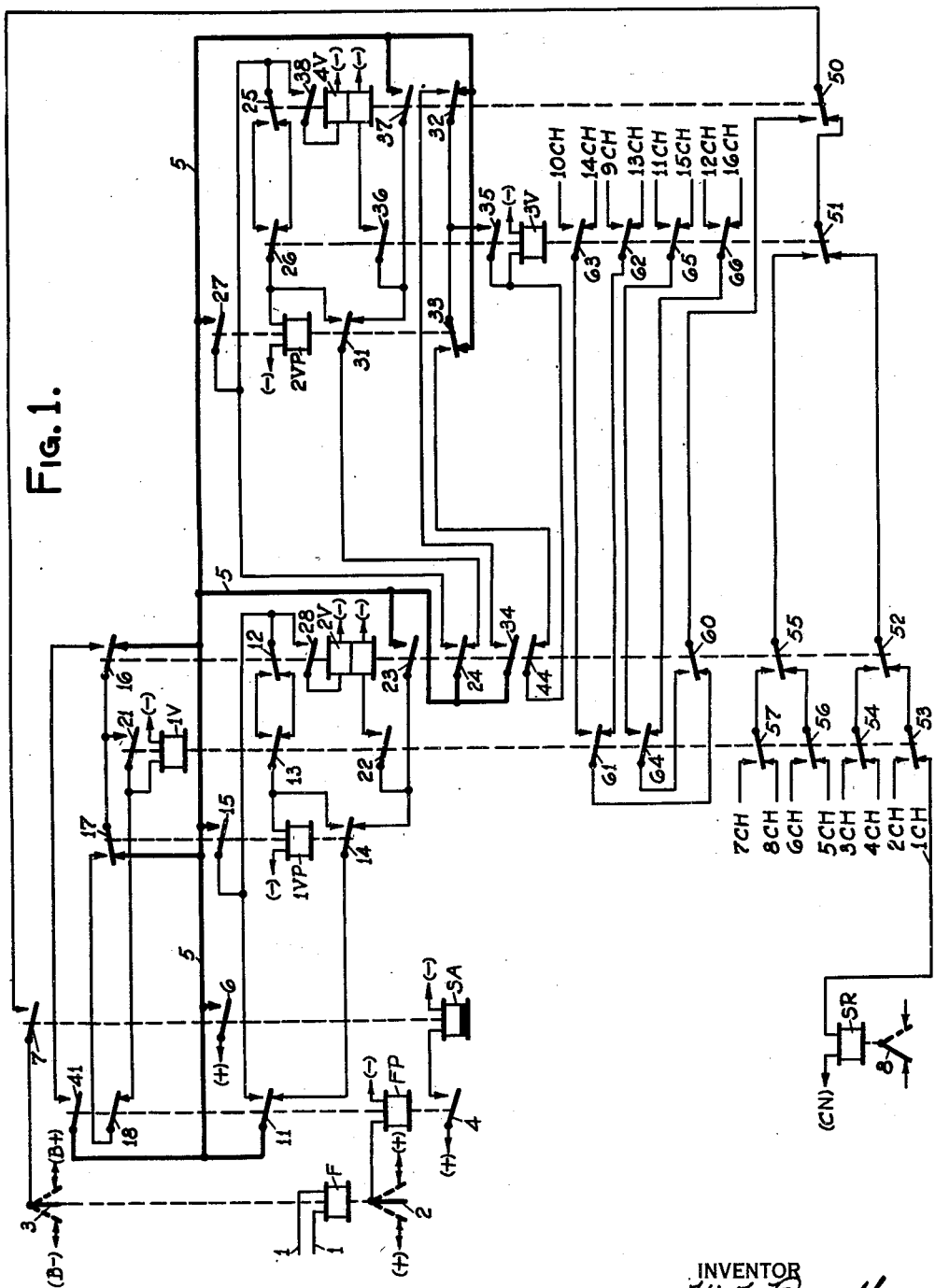
INVENTOR
W. T. Powell,
BY Neil D. Ralston
ATTORNEY April 12, 1938.   W. T. POWELL   2,114,255
CENTRALIZING TRAFFIC CONTROLLING SYSTEM FOR RAILROADS
Filed April 28, 1934   2 Sheets-Sheet 2

FIG. 2.

TYPICAL OPERATION CHART

| No. of Operation | RELAY REFERENCE CHARACTERS ||||||| No. of Channel |
| --- | --- | --- | --- | --- | --- | --- | --- | --- |
|  | FP | 1VP | 1V | 2V | 2VP | 3V | 4V |  |
| 1  | P.U. | P.U. |      |      |      |      |      | 1CH |
| 2  | D.A. |      | P.U. |      |      |      |      |     |
| 3  | P.U. | D.A. |      |      |      |      |      | 2CH |
| 4  | D.A. |      |      | P.U. | P.U. |      |      |     |
| 5  | P.U. | P.U. |      |      |      |      |      | 3CH |
| 6  | D.A. |      | D.A. |      |      |      |      |     |
| 7  | P.U. | D.A. |      |      |      |      |      | 4CH |
| 8  | D.A. |      |      | D.A. |      | P.U. |      |     |
| 9  | P.U. | P.U. |      |      |      |      |      | 5CH |
| 10 | D.A. |      | P.U. |      |      |      |      |     |
| 11 | P.U. | D.A. |      |      |      |      |      | 6CH |
| 12 | D.A. |      |      | P.U. | D.A. |      |      |     |
| 13 | P.U. | P.U. |      |      |      |      |      | 7CH |
| 14 | D.A. |      | D.A. |      |      |      |      |     |
| 15 | P.U. | D.A. |      |      |      |      |      | 8CH |
| 16 | D.A. |      |      | D.A. |      |      | P.U. |     |
| 17 | P.U. | P.U. |      |      |      |      |      | 9CH |
| 18 | D.A. |      | P.U. |      |      |      |      |     |
| 19 | P.U. | D.A. |      |      |      |      |      | 10CH |
| 20 | D.A. |      |      | P.U. | P.U. |      |      |     |
| 21 | P.U. | P.U. |      |      |      |      |      | 11CH |
| 22 | D.A. |      | D.A. |      |      |      |      |     |
| 23 | P.U. | D.A. |      |      |      |      |      | 12CH |
| 24 | D.A. |      |      | D.A. |      | D.A. |      |     |
| 25 | P.U. | P.U. |      |      |      |      |      | 13CH |
| 26 | D.A. |      | P.U. |      |      |      |      |     |
| 27 | P.U. | D.A. |      |      |      |      |      | 14CH |
| 28 | D.A. |      |      | P.U. | D.A. |      |      |     |
| 29 | P.U. | P.U. |      |      |      |      |      | 15CH |
| 30 | D.A. |      | D.A. |      |      |      |      |     |
| 31 | P.U. | D.A. |      |      |      |      |      | 16CH |
| 32 | D.A. |      |      | D.A. |      |      | D.A. |     |

INVENTOR
W. T. Powell,
BY Neil H. Preston
ATTORNEY

Patented Apr. 12, 1938

2,114,255

UNITED STATES PATENT OFFICE 2,114,255

CENTRALIZING TRAFFIC CONTROLLING SYSTEM FOR RAILROADS

Winfred T. Powell, Rochester, N. Y., assignor to General Railway Signal Company, Rochester, N. Y.

Application April 28, 1934, Serial No. 722,891

10 Claims. (Cl. 177—353)

This invention relates to centralized traffic controlling systems for railroads and it more particularly pertains to the communication apparatus employed in such systems.

In centralized traffic controlling systems employing the coded type communication system, such for example as disclosed in the pending application of Judge and Bushnell Ser. No. 640,062 filed October 28, 1932, Patent No. 2,082,544 dated June 1, 1937, it is desirable to employ step-by-step mechanism which requires a minimum amount of apparatus to accomplish the necessary operations.

In the present invention a step-by-step mechanism is proposed for coded type systems in which a bank of stepping relays is used to make up or select a plurality of local channel circuits. This bank of stepping relays includes a plurality of what may be termed relay groups, each group comprising a steering relay and two stepping relays. These relay groups are identical in repeating the various stepping operations and any number may be employed in the stepping relay bank as determined by the number of channel circuits to be selected.

The stepping relays select the channel circuits while the steering relays cooperate in the control of the stepping relays, with the steering relays shifting their positions in the proper "off" and "on" periods as repeated by the impulse relay. It will be understood that the "off" periods mentioned in this specification refer to the deenergized periods of the line circuit over which impulses are transmitted. The "on" periods mentioned refer to the energized periods of the line circuit during impulsing. The impulse repeating relay is the relay which repeats the impulses transmitted over the line circuit, these impulses being counted by the stepping relay bank for selecting the individual channel circuits. This impulse repeating relay will be referred to as the control relay in the following description.

The present invention is an improvement over applicant's Patent No. 2,067,145, issued January 5, 1937. In this prior patent there was a steering or half step relay (VP) for each stepping relay (V) and the main difference in the present invention is that there is a steering or half step relay for every two stepping relays. Thus in the present invention 16 channel circuits are selectable by means of 6 relays (including the steering relays), while in the prior patent it required 8 relays to select 16 channel circuits. In the prior patent, for each group of two relays added the number of channels is doubled, while in the present invention for each group of three relays added the number of channels is multiplied by 4. This is because, in the present invention, each pair of stepping relays, in cooperation with its associated steering relay, selects as many channels as there are possible up and down combinations of the stepping relays. Thus four stepping relays select 16 channels, 6 stepping relays select 64 channels, etc., with a VP or steering relay for each pair of V or stepping relays in the present invention.

Other objects, purposes and characteristic features of the present invention will be in part obvious from the accompanying drawings and in part pointed out as the description thereof progresses.

In describing the invention in detail reference will be made to the accompanying drawings in which like characters designate similar parts, with the preceding numerals used to designate the order of operation of the various relays and in which:—

Fig. 1 illustrates a stepping relay bank arranged in accordance with the present invention; and Fig. 2 shows a typical operation chart for a stepping relay bank arranged as in Fig. 1.

For the purpose of simplifying the illustration and facilitating in its explanation the various parts and circuits constituting the invention have been shown diagrammatically and certain conventional illustrations have been employed. The drawings have been made more with the purpose of making it easy to understand the principles and mode of operation, rather than an attempt to illustrate the specific construction and arrangement of parts that would be employed in practice. The various relays and their contacts are illustrated in a conventional manner and symbols are used to indicate connections to the terminals of batteries or other sources of current instead of showing all of the wiring connections to these terminals.

The symbols (+) and (—) are employed to indicate the positive and negative terminals respectively of suitable sources of direct current and the circuits with which these symbols are used always have current flowing in the same direction. The symbols (B+) and (B—) indicate connections to the opposite terminals of a source of direct current which has an intermediate tap (CN) and the circuits with which these circuits are used may have current flowing in one direction or the other depending upon the particular terminal used in combination with the tap (CN).

While certain features of the present invention are applicable to and usable with any type of centralized traffic controlling communication system, the specific embodiment of the invention has been shown in a form adapted for use with a selective communication system of the coded type, such as shown and described in detail in the above mentioned pending application Ser. No. 640,062. Therefore, before considering the structure and mode of operation of the parts constituting this invention an explanation of some of the features of the communication system will be given, reference being made to said prior application for other details of the structure and operation of such a system not directly related to the features of this invention.

The centralized traffic controlling system contemplated as being one in which the present invention may be particularly useful includes a control office and a plurality of field stations to which and from which controls and indications respectively are transmitted. The control office and each field station includes a bank of stepping relays which are operated in synchronism through cycles of operation, each cycle comprising a predetermined number of steps. On each of these steps the control line circuit connecting the office with the stations is conditioned in accordance with code calls and controls for the selection of a particular station and the transmission of controls to that station. Similarly on each of these steps a field station may be conditioning an indication line circuit interconnecting the office with the several stations, whereby that field station is registered in the control office followed by the transmission of its indications.

The conditioning of the line circuits at the control office and the field stations, as well as the reception of these conditions at the respective locations, is accomplished at each step by means of what are conveniently termed local channel circuits.

Although these local channel circuits are employed both for the transmission and reception of controls and for the transmission and reception of indications, the present invention has been shown as applied to the step-by-step apparatus at a field station for the reception of controls at that station.

Description of apparatus

With reference to Fig. 1, the step-by-step apparatus at a typical field station is illustrated as being controlled over a line circuit which includes a pair of line wires 1 and a three-position biased to neutral polarized line relay F. It is assumed that different series of impulses are placed upon this line circuit in the control office for causing the step-by-step operation at the various stations, irrespective of the polarity of the impulses. The polarity of the impulses of a series forms the code call and the controls to be transmitted for that series. Line relay F is provided with contacts 2 and 3 which are operated to their right hand dotted positions by a positive impulse in the line circuit and to their left hand dotted positions by a negative impulse in the line circuit.

A quick acting line repeating or control relay FP repeats each energization of line relay F, irrespective of the polarity of such energization by reason of the closure of contact 2 of relay F in either of its positions, which completes an energizing circuit for relay FP.

A slow acting relay SA is energized each time relay FP picks up by reason of a circuit closed at front contact 4 of relay FP. Relay SA is slow in picking up and slow in dropping away, although its pick up time is less than its drop away time. This arrangement effects the picking up of relay SA at the beginning of each series of impulses and the holding of this relay in its picked up position throughout the series of impulses irrespective of the time spaces between successive impulses, but at the end of each series relay SA drops when the line has been deenergized for a comparatively long period of time. Thus the closure of front contact 6 of relay SA energizes wire 5 throughout any series of impulses and deenergizes this wire between the successive application of different series of impulses. It will thus be seen that during the step-by-step operation of a series, wire 5 may be considered as being the (+) terminal of the source of current since (+) is connected to this wire throughout the series at front contact 6 of relay SA.

The stepping relay bank includes a plurality of relay groups of which two are shown. The first group includes two stepping relays 1V and 2V and a steering relay 1VP. The second group includes two stepping relays 3V and 4V and a steering relay 2VP.

A two-position polarized relay SR of the magnetic stick type is illustrated as controlled on the first local channel circuit and it will be understood that any type of relay may be employed on any channel circuit and that the channel circuits may be used for any desired purpose, but since the type of relay and the purpose for which the relays connected to the channel circuits are used is immaterial to an understanding of the invention, only one such relay is shown as being a typical arrangement. Relay SR has a polar contact 8 which is operable to right or left hand positions, dependent upon whether the winding of this relay is energized with positive or negative potential respectively.

It is believed that the nature of the invention, its advantages and characteristic features can be best understood with further description being set forth from the standpoint of operation.

Operation

With the system in a normal condition, the relays illustrated in Fig. 1 are all normally deenergized.

It will now be assumed that a series of time spaced impulses are placed upon line circuit 1, which series includes 16 energized or "on" periods together with 16 deenergized or "off" periods. It will also be assumed that the first "on" period is relatively longer than the rest and that the last "on" period of the series is followed by a comparatively long deenergized period before another series is applied to the line circuit. The polarity of each of these impulses may be determined in accordance with the usual means of such a coded type system, the particular code arrangement being immaterial for an understanding of the present invention, except that it should be understood that each impulse received by relay F may be either positive or negative in character and such distinctive character is effective to position particular devices, such as relay SR, in accordance therewith.

Although a particular channel circuit is completed for each full step taken by the stepping relay bank, the making up of these channel circuits will be pointed out following the description of the step-by-step operation.

*Step-by-step operation.*—The first impulse in the line (first "on" period) is repeated by control relay FP, so that the resulting closure of its front contact 4 causes relay SA to be energized. Since the first impulse of the series is relatively long as compared with the remaining impulses, sufficient time is provided for contacts 6 and 7 of relay SA to pick up. When relay SA is once picked up it remains up throughout the cycle due to its slow acting characteristics, although its circuit is intermittently interrupted by contact 4 of relay FP.

As soon as relay SA closes its front contact 6 a pick up circuit is completed for relay IVP which extends from (+), front contact 6 of relay SA, front contact II of relay FP, back contact 12 of relay 2V, back contact 13 of relay IV and winding of relay IVP to (−). Relay IVP closes a temporary stick circuit for itself extending from (+), front contact 6 of relay SA, front contact 15 of relay IVP, back contacts 12 and 13 of relays 2V and IV respectively and winding of relay IVP to (−). It is apparent that this stick circuit will remain energized until relay IV opens its back contact 13. This corresponds to operation No. 1 in the typical operation chart of Fig. 2.

The beginning of the first "off" period is marked by the dropping of relay FP when the line is de-energized. A holding stick circuit is completed for relay IVP which extends from (+), front contact 6 of relay SA, back contact II of relay FP, front contact 14 and winding of relay IVP to (−). This holding stick circuit is closed prior to the opening of the above described temporary stick circuit by the picking up of relay IV now to be described.

Relay IV is picked up during the first "off" period over a circuit extending from (+), front contact 6 of relay SA, back contact 16 of relay 2V, front contact 17 of relay IVP, back contact 18 of relay FP and winding of relay IV to (−). Relay IV closes a temporary stick circuit for itself extending from (+), front contact 6 of relay SA, back contact 16 of relay 2V, front contact 21 and winding of relay IV to (−). This is operation No. 2 in the operation chart.

When relay FP picks up to mark the beginning of the second "on" period, relay IVP is dropped because its temporary stick circuit was opened at back contact 13 of relay IV and its holding stick circuit is opened at back contact II of relay FP. This is operation No. 3 in the chart.

When relay FP drops to mark the beginning of the second "off" period, a circuit is closed for picking up relay 2V which extends from (+), front contact 6 of relay SA, back contact II of relay FP, back contact 14 of relay IVP, front contact 22 of relay IV and lower winding of relay 2V to (−). The picking up of back contact 16 of relay 2V interrupts the temporary stick circuit previously described for relay IV but before back contact 16 picks up, a holding stick circuit is provided for relay IV extending from (+), front contact 6 of relay SA, back contact 17 of relay IVP, front contact 21 and winding of IV to (−). The picking up of relay 2V closes a temporary stick circuit for itself extending from (+), front contact 6 of relay SA, front contact 23 of relay 2V, front contact 22 of relay IV and lower winding of relay 2V to (−). This is operation No. 4 in the chart.

When relay FP picks up to mark the beginning of the third "on" period, relay IVP is picked up over a circuit extending from (+), front contact 6 of relay SA, front contact II of relay FP, front contacts 12 and 13 of relays 2V and IV respectively and winding of relay IVP to (−). Relay IVP closes a temporary stick circuit for itself extending from (+), front contact 6 of relay SA, front contact 15 of relay IVP, front contacts 12 and 13 of relays 2V and IV respectively and winding of relay IVP to (−). This is operation No. 5 in the chart.

When relay FP drops to mark the beginning of the third "off" period, relay IV is dropped because its temporary stick circuit is open at back contact 16 of relay 2V (now picked up). The holding stick circuit of relay IV is open at back contact 17 of relay IVP (now picked up). This is operation No. 6 in the chart.

Relay IVP remains up during the third "off" period due to a holding stick circuit which extends from (+), front contact 6 of relay SA, back contact II of relay FP, front contact 14 and winding of relay IVP to (−). Relay 2V remains up during the third "off" period, after relay IV drops its contact 22, by means of its holding stick circuit which extends from (+), front contact 6 of relay SA, front contact 15 of relay IVP, front contact 28 and upper winding of 2V to (−).

When relay FP picks up to mark the beginning of the fourth "on" period, relay IVP is dropped because its temporary stick circuit is open at front contact 13 of relay IV (now down) and because its holding stick circuit is open at back contact II of relay FP. This is operation No. 7 in the chart.

When relay FP drops to mark the beginning of the fourth "off" period, relay 2V is dropped because its temporary stick circuit is open at front contact 22 of relay IV (now down) and because its holding stick circuit is open at front contact II of relay FP (now down) and front contact 15 of relay IVP (now down). This is operation No. 8 in the chart.

The above explanation shows how the first group of relays including relays IVP, IV and 2V make a complete cycle of operations in response to 4 complete cycles of relay FP. Since the relay operations are repeated for each additional 4 cycles of relay FP in the same manner, it is not believed necessary to continue the description for the remaining impulses repeated by the FP relay. It will be noted by referring to the operation chart that each additional 8 operations in column 1 is a repetition of the first 8 operations as far as relays FP, IVP, IV and 2V are concerned.

Recalling that relay FP is picked up in each "on" period and dropped away in each "off" period, which operation is clearly indicated in Fig. 2, it will be observed that relay IVP is picked up in the first, third and all other odd "on" periods and dropped away in the second, fourth and all other even "on" periods. This is indicated in Fig. 2, in which each pair of operations in the first column represents an "on" and an "off" period, with the "on" period being the odd numbered operation and the "off" period the even numbered operation. The third column of this chart shows relay IVP picked up and dropped away by the alternate picking up of relay FP. The second column shows relay FP picked up and dropped away by each "on" and "off" period respectively.

It will also be noted from the above description and by referring to Fig. 2 that relay IV is picked up in the first, fifth, ninth and thirteenth "off" periods and dropped away in the third, seventh, eleventh and fifteenth "off" periods. Relay 2V is picked up in the second, sixth, tenth and fourteenth "off" periods and dropped away in the fourth, eighth, twelfth and sixteenth "off" periods.

It will thus be seen that the first group of relays, including steering relay IVP and stepping relays IV and 2V, completes a cycle for 4 "on" and "off" periods. This same operation is repeated for succeeding periods of the series so that this group of relays completes 4 cycles for the 16 "on" and "off" periods indicated in Fig. 2.

Similarly, as the first relay group repeats the operations of control relay FP, the second relay group, comprising steering relay 2VP and stepping relays 3V and 4V, repeat the operations of relay 2V. Likewise a third relay group when provided would repeat the operations of relay 4V of the second relay group, and so on.

Each relay group is similar, with the pick up and stick circuits of relays 2VP, 3V and 4V controlled from contacts 24, 34 and 44 of relay 2V in the same manner that the first relay group is controlled by contacts 11, 18 and 41 of relay FP. When an additional relay group is added there will be contacts on relay 4V similar to contacts 24, 34 and 44 for controlling this group.

It is therefore believed unnecessary to describe the operation of the second relay group in detail although the circuits will be traced out.

The pick up circuit for relay 2VP, which is effective when relay 2V is picked up, extends from (+) on conductor 5, front contact 24 of relay 2V, back contacts 25 and 26 of relays 4V and 3V respectively and winding of relay 2VP to (—). The temporary stick circuit for relay 2VP extends from (+) on conductor 5, front contact 27 of relay 2VP, back contacts 25 and 26 of relays 4V and 3V respectively and winding of relay 2VP to (—). The holding stick circuit for relay 2VP extends from (+) on conductor 5, back contact 24 of relay 2V, front contact 31 and winding of relay 2VP to (—).

The pick up circuit for relay 3V is closed when relay 2V is dropped in the fourth "off" period and extends from (+) on conductor 5, back contact 32 of relay 4V, front contact 33 of relay 2VP, back contact 44 of relay 2V and winding of relay 3V to (—). The temporary stick circuit for relay 3V extends from (+) on conductor 5, back contact 32 of relay 4V, front contact 35 and winding of relay 3V to (—).

Relay 2VP is dropped in the sixth "off" period when relay 2V picks up because its temporary stick circuit has been opened at back contact 26 of relay 3V and its holding stick circuit is opened at back contact 24 of relay 2V.

Relay 4V is picked up in the eighth "off" period when relay 2V is dropped, over a circuit extending from (+) on conductor 5, back contact 24 of relay 2V, back contact 31 of relay 2VP, front contact 36 of relay 3V and lower winding of relay 4V to (—). The temporary stick circuit for relay 4V extends from (+) on conductor 5, front contact 37 of relay 4V, front contact 36 of relay 3V and lower winding of relay 4V to (—). The holding stick circuit for relay 4V extends from (+) on conductor 5, front contact 27 of relay 2VP, front contact 38 and upper winding of relay 4V to (—).

It is not believed necessary to explain the dropping away of relays 2VP, 3V and 4V since these operations are accomplished in exactly the same manner described for relays IVP, IV and 2V when contacts 24, 34 and 44 of relay 2V shift to accomplish the same results in the second group as the shifting of contacts 11, 18 and 41 of relay FP accomplish in the first group.

At the end of the series of impulses, the last deenergization of the line circuit causes the prolonged deenergization of relay FP which drops relay SA. Relay SA removes (+) potential from conductor 5 at its contact 6 so that all stepping relays which are energized will be deenergized. If a different number of groups are provided than shown in Fig. 1, or in the event that the stepping did not continue for the full number of steps, the dropping of relay SA at the termination of the stepping operation will cause the deenergization of all relays by reason of the deenergization of conductor 5.

*Channel circuits.*—Referring to the chart of Fig. 2 it will be noted that the No. 1 channel circuit (see last column) is selected at the first operation of the system, or in other words during the first "on" period. Referring to Fig. 1 it will be noted that channel circuit ICH is energized at the first "on" period, before any stepping relay is picked up, over a circuit extending from (B+) or (B—) at contact 3 of relay F, front contact 7 of relay SA, back contacts 50, 51, 52 and 53 of relays 4V, 3V, 2V and IV respectively. Since the No. 1 channel circuit is connected to relay SR, this relay will be actuated to right or left hand positions in accordance with the polarity applied to the above described circuit.

The No. 2 channel circuit is energized during the second "on" period over a circuit extending from contact 3 of relay F, front contact 7 of relay SA, back contacts 50, 51, and 52 of relays 4V, 3V and 2V respectively and front contact 53 of relay IV.

The No. 3 channel circuit is energized in the third "on" period over a circuit extending from contact 3 of relay F, front contact 7 of relay SA, back contacts 50 and 51 of relays 4V and 3V respectively, front contacts 52 and 54 of relays 2V and IV respectively.

Channel No. 4 is energized in the fourth "on" period over a circuit extending from contact 3 of relay F, front contact 7 of relay SA, back contacts 50 and 51 of relays 4V and 3V respectively, front contact 52 of relay 2V and back contact 54 of relay IV.

Channel No. 5 is energized in the fifth "on" period over a circuit extending from contact 3 of relay F, front contact 7 of relay SA, back contact 50 of relay 4V, front contact 51 of relay 3V, back contacts 55 and 56 of relays 2V and IV respectively.

Channel No. 6 is energized in the sixth "on" period over a circuit extending from contact 3 of relay F, front contact 7 of relay SA, back contact 50 of relay 4V, front contact 51 of relay 3V, back contact 55 of relay 2V and front contact 56 of relay IV.

Channel circuit No. 7 is energized in the seventh "on" period over a circuit extending from contact 3 of relay F, front contact 7 of relay SA, back contact 50 of relay 4V, front contact 51 of relay 3V, front contacts 55 and 57 of relays 2V and IV respectively.

Channel No. 8 is energized in the eighth "on" period over a circuit extending from contact 3 of relay F, front contact 7 of relay SA, back contact 50 of relay 4V, front contact 51 of relay 3V, front contact 55 of relay 2V and back contact 57 of relay IV.

Since relay 4V is picked up before the beginning of the ninth "on" period and since this relay stays up throughout the remainder of the cycle, the 8 channel circuits of the second group are selected through front contact 50 of relay 4V.

Channel No. 9 is selected through back contact 60 of relay 2V, back contact 61 of relay IV and front contact 62 of relay 3V.

Channel No. 10 is selected through back contact 60 of relay 2V, front contact 61 of relay IV and front contact 63 of relay 3V.

Channel No. 11 is selected through front contact 60 of relay 2V, front contact 64 of relay IV and front contact 65 of relay 3V.

Channel No. 12 is selected through front contact 60 of relay 2V, back contact 64 of relay IV and front contact 66 of relay 3V.

Channel No. 13 is selected through back contacts 60, 61 and 62 of relays 2V, IV and 3V respectively.

Channel No. 14 is selected through back contact 60 of relay 2V, front contact 61 of relay IV and back contact 63 of relay 3V.

Channel No. 15 is selected through front contacts 60 and 64 of relays 2V and IV respectively and back contact 65 of relay 3V.

Channel No. 16 is selected through front contact 60 of relay 2V, back contacts 64 and 66 of relays IV and 3V respectively.

In this connection it will be noted that front contact 7 of relay SA is not essential to render the present system operable, but it is provided so that the local channel circuit No. 1 may be protected from a temporary energization due to a surge in the line circuit. This is accomplished because such a surge would be of insufficient duration to pick up relay SA.

The channel circuits may be extended in number for any number of relay groups in a manner similar to that illustrated, thereby multiplying the number of available channel circuits by 4 for each additional group of relays.

It is to be understood that the channel circuits illustrated may be employed for other purposes than for the reception of controls from the line circuit such as, for example, the control of a pulsing relay to govern an indication line circuit or for various other purposes such, for example, as disclosed in the above mentioned application Ser. No. 640,062.

Having described a stepping relay bank as particularly adaptable for selective type communication systems in centralized traffic controlling systems as one specific embodiment of the present invention, it is desired to be understood that this form is selected to facilitate in the disclosure of the invention rather than to limit the number of forms which it may assume. It is further to be understood that various modifications, adaptations and alterations may be applied to the specific form shown to meet the requirements of practice without in any manner departing from the spirit or scope of the present invention, except as limited by the appended claims.

What I claim is:—

1. In combination, a control relay for repeating a series of impulses, a group of relays comprising an odd and an even stepping relay and a steering relay, means for causing said steering relay to operate to alternate positions in response to each impulse of said series, and means controlled by said control relay and said steering relay for causing said odd stepping relay to operate to alternate positions in response to odd numbered impulses of said series and for causing said even stepping relay to operate to alternate positions in response to even numbered impulses of said series, and a plurality of channel circuits closed by contacts of said stepping relays in their different positions.

2. In combination, a control relay for repeating a first series of impulses, a first and a second group of relays each comprising an odd and an even stepping relay and a steering relay, means for causing the steering relay of said first group to operate to alternate positions in response to each impulse of said first series, means controlled by said control relay and the steering relay of said first group for causing the odd stepping relay of said first group to operate to alternate positions in response to odd numbered impulses of said first series and for causing the even stepping relay of said first group to operate to alternate positions in response to even numbered impulses of said first series, means controlled by the stepping relays of said first group for repeating a second series of impulses, means for causing the steering relay of said second group to operate to alternate positions in response to each impulse of said second series, and means controlled by the stepping relays of said first group and the steering relay of said second group for causing the odd stepping relay of said second group to operate to alternate positions in response to odd numbered impulses of said second series and for causing the even stepping relay of said second group to operate to alternate positions in response to even numbered impulses of said second series.

3. In combination; a control relay having front and back contacts; a first stepping relay and a second stepping relay; a steering relay; a pick up circuit for said first stepping relay including a back contact of said control relay and a front contact of said steering relay; a temporary stick circuit for said first stepping relay including its own front contact and a back contact of said second stepping relay; a holding stick circuit for said first stepping relay including its own front contact and a back contact of said steering relay; a pick up circuit for said steering relay including a back contact of said first stepping relay, a back contact of said second stepping relay and a front contact of said control relay; a temporary stick circuit for said steering relay including its own front contact and said back contacts of said stepping relays; and a holding stick circuit for said steering relay including its own front contact and a back contact of said control relay, and a separate channel circuit closed by said stepping relays in each of their different picked up and dropped away combinations of positions.

4. In combination; a control relay; impulse means for operating and releasing said control relay through a plurality of cycles; a plurality of groups of stepping relays, each group comprising two stepping relays and a steering relay and the total number of stepping relays and steering relays being less than half the number of operations of said control relay during a cycle; means including the steering relay of the first of said groups and responsive to the operation of said control relay for causing the first of said groups of relays to effect one-fourth as many cycles of operations as said control relay; means including the steering relay of each remaining group for causing each remaining group of relays to effect one-fourth as many cycles of operations as its preceding group; means responsive to the operation of said groups of relays for selecting a number of channel circuits, said number being equal to four raised to the power of the number of said groups of relays; and electro-responsive means individually responsive to each operation of said impulse means and controlled through the medium of said channel circuits.

5. In combination; a circuit over which a plurality of time-spaced impulses are received; a control relay; a number of pairs of stepping relays; a steering relay for each pair of stepping relays; means responsive to said impulses for causing said control relay to apply a plurality of time-spaced repeated impulses to said steering relays and said pairs of stepping relays; means controlled by said steering relays for steering said repeated impulses to said pairs of stepping relays in such an order that each succeeding pair will be operated and released one-fourth the number of times its next preceding pair is operated and released; a number of channel circuits equal to four raised to the power of the number of pairs of said stepping relays; and means responsive to said operation and release of said stepping relays for sequentially and individually selecting said number of channel circuits.

6. In combination; a plurality of channel circuits; a normally de-energized impulse relay; means for transmitting a group of time-spaced impulses to said impulse relay equal in number to the number of said channel circuits; means controlled by said impulses for operating said relay once for each impulse and releasing said impulse relay once for each time space between impulses; a plurality of counting relays; a first and a second steering relay; means rendered effective by the first operation of said impulse relay and including said steering relays for effecting the operation of said counting relays one at a time in sequence through repeated cycles when said impulse relay is operated and released repeatedly; means controlled by said impulse relay and certain of said counting relays for energizing said first steering relay at each odd energization of said impulse relay; means controlled by said impulse relay and said certain counting relays for de-energizing said first steering relay at each even energization of said impulse relay; means controlled by said impulse relay and certain other of said counting relays for energizing said second steering relay at the second and tenth de-energizations of said impulse relay; means controlled by said impulse relay and said certain other counting relays for de-energizing said second steering relay at the sixth and fourteenth de-energizations of said impulse relay; and means for selectively energizing said channel circuits comprising a circuit for each channel circuit including a contact of each counting relay of said plurality, one-half of said channel circuits including back contacts and the other half front contacts of said counting relays, whereby said channel circuits may be selectively energized one at a time in sequence each in accordance with the total number of impulses transmitted to said impulse relay.

7. In combination; a plurality of channel circuits; a normally de-energized impulse relay; means for transmitting a group of time-spaced impulses to said impulse relay equal in number to the number of said channel circuits; means controlled by said impulses for operating said relay once for each impulse and releasing said impulse relay once for each time space between impulses; a plurality of counting relays; a first and a second steering relay; means rendered effective by the first operation of said impulse relay and including said steering relays for effecting the operation of said counting relays one at a time in sequence through repeated cycles when said impulse relay is operated and released repeatedly; means controlled by said impulse relay and certain of said counting relays for energizing said first steering relay at each odd energization of said impulse relay; means controlled by said impulse relay and said certain counting relays for de-energizing said first steering relay at each even energization of said impulse relay; means controlled by said impulse relay and certain other of said counting relays for energizing said second steering relay at the second and tenth de-energizations of said impulse relay; means controlled by said impulse relay and said certain other counting relays for de-energizing said second steering relay at the sixth and fourteenth de-energizations of said impulse relay; means for selectively energizing said channel circuits comprising a circuit for each channel circuit including a contact of each counting relay of said plurality, one-half of said channel circuits including back contacts and the other half front contacts of said counting relays, whereby said channel circuits may be selectively energized one at a time in sequence each in accordance with the total number of impulses transmitted to said impulse relay; and means selectively responsive to the termination of the transmission of said impulses for releasing or not releasing said counting and steering relays in accordance with whether said termination is due to an impulse or a time space.

8. In combination; a plurality of groups of stepping relays, each group comprising two stepping relays and a steering relay; a line circuit over which a number of impulses of distinctive character are transmitted, said number being equal to four raised to the power of the number of groups of stepping relays in said plurality; repeating means characteristically operated in response to said impulses; means controlled by said repeating means for operating said steering relays; means controlled by said repeating means and said steering relays for operating said stepping relays in such an order that each succeeding group will be operated one-fourth the number of times its next preceding group is operated; and means responsive to the characteristic operation of said repeating means and the operation of said stepping relays for distinctively registering in rotation the character of each of said number of impulses.

9. In combination, a control relay for repeating a plurality of impulses, a group of relays comprising an odd and an even stepping relay and a steering relay, means controlled by said control relay and said steering relay for causing said odd stepping relay to operate to alternate positions in response to odd numbered impulses of said plurality and for causing said even stepping relay to operate to alternate positions in response to even numbered impulses of said plurality, circuit means including contacts controlled by said stepping relays in corresponding and non-corresponding positions for operating said steering relay to one position and another respectively, and means controlled by contacts on said control relay for sticking said steering relay in said one position.

10. In combination, a control relay for repeating a plurality of impulses, a group of relays comprising an odd and an even stepping relay and a steering relay, means controlled by said control relay and said steering relay for causing said odd stepping relay to operate to alternate positions in response to odd numbered impulses of said plurality and for causing said even stepping relay to operate to alternate positions in response to even numbered impulses of said plurality, circuit means including contacts controlled by said stepping relays in corresponding and non-corresponding positions for operating said steering relay to one position and another respectively, a first means controlled by contacts on said control relay and exclusive of contacts on either of said stepping relays for sticking said steering relay in said one position, and a second means controlled by contacts on said stepping relays in corresponding positions and exclusive of contacts on said control relay for sticking said steering relay in said one position.

WINFRED T. POWELL.